US 7,489,729 B2

United States Patent
Chen et al.

(10) Patent No.: US 7,489,729 B2
(45) Date of Patent: *Feb. 10, 2009

(54) METHOD AND APPARATUS FOR IMPLEMENTING REDUCED MEMORY MODE FOR HIGH-DEFINITION TELEVISION

(75) Inventors: Sherman Xuemin Chen, Irvine, CA (US); Jason Demas, Irvine, CA (US); Sandeep Bhatia, Benson Town (IN)

(73) Assignee: Broadcom Corporation, Irvine, CA (US)

( * ) Notice: Subject to any disclaimer, the term of this patent is extended or adjusted under 35 U.S.C. 154(b) by 519 days.

This patent is subject to a terminal disclaimer.

(21) Appl. No.: 11/204,595

(22) Filed: Aug. 15, 2005

(65) Prior Publication Data

US 2005/0271145 A1 Dec. 8, 2005

Related U.S. Application Data

(63) Continuation of application No. 10/045,194, filed on Oct. 19, 2001, now Pat. No. 6,983,017.

(60) Provisional application No. 60/313,613, filed on Aug. 20, 2001.

(51) Int. Cl.
*H04N 7/12* (2006.01)

(52) U.S. Cl. .............................. 375/240.25; 375/240.12

(58) Field of Classification Search ............. 348/412.1, 348/415.1, 582, 581, 458, 397, 412, 415, 348/397.1; 375/240.1, 240.12, 240.16, 240.01, 375/240.18, 240.26, 240.25; 382/232, 233, 382/238, 240

See application file for complete search history.

(56) References Cited

U.S. PATENT DOCUMENTS

| 5,262,854 A | 11/1993 | Ng |
| 5,307,177 A | 4/1994 | Shibata et al. |
| 5,396,567 A | 3/1995 | Jass |
| 5,614,952 A | 3/1997 | Boyce et al. |

(Continued)

FOREIGN PATENT DOCUMENTS

EP    1 026 884 A2    8/2000

(Continued)

OTHER PUBLICATIONS

Zhong, Zhun, et al., "Scaling in MPEG-2 decoding loop with mixed processing" International Conference on Consumer Electronics, 2001 Digest of Technical Papers, ICCE, Los Angeles, CA Jun. 19-21, 2001, New York, NY, IEEE, US, Jun. 19, 2001 pp. 76-77, XPO010552075, ISBN: 0-7803-6622-0.

(Continued)

*Primary Examiner*—Behrooz Senfi
(74) *Attorney, Agent, or Firm*—McAndrews, Held & Malloy, Ltd.

(57) ABSTRACT

A method and apparatus are provided for implementing an enhanced reduced memory mode (RMM) of decoding HDTV MPEG-2 video stream. In one instance, the RMM mode is adaptively enabled with up/down conversion by using the picture-type information. In another instance, the RMM mode is provided by performing anchor-frame compression/decompression by using adaptive DPCM technique with picture-type information. The quantization (PCM) tables are generated using the Lloyd algorithm. Further, the predictor for each pixel is determined by a use of the Graham rule.

21 Claims, 7 Drawing Sheets

U.S. PATENT DOCUMENTS

| | | | |
|---|---|---|---|
| 5,635,985 | A | 6/1997 | Boyce et al. |
| 5,844,608 | A | 12/1998 | Yu et al. |
| 6,175,595 | B1 * | 1/2001 | Keesman ............... 375/240.25 |
| 6,333,952 | B1 * | 12/2001 | Lim et al. ............... 375/240.27 |
| 6,393,152 | B2 | 5/2002 | Takahashi et al. |
| 6,417,889 | B1 | 7/2002 | Numata |
| 6,563,876 | B2 * | 5/2003 | Boyce et al. ........... 375/240.15 |
| 6,618,443 | B1 | 9/2003 | Kim et al. |
| 6,983,017 | B2 * | 1/2006 | Chen et al. ............. 375/240.12 |
| 2001/0026677 | A1 | 10/2001 | Chen et al. |
| 2001/0055339 | A1 | 12/2001 | Choi |
| 2003/0112869 | A1 * | 6/2003 | Chen et al. ............. 375/240.12 |

FOREIGN PATENT DOCUMENTS

| | | |
|---|---|---|
| JP | 11298892 | 10/1999 |
| KR | 249229 B | 3/2000 |

OTHER PUBLICATIONS

EP Search Report for European Application No. 02090296.1, dated Dec. 23, 2004.

Vetro, Anthony, et al., "Minimum Drift Architectures for 3-Layer Scalable DTV Decoding," IEEE Transactions on Consumer Electronics, pp. 527-536, vol. 44, No. 3, Aug. 1998.

Mokry, Robert, et al., "Minimal Error Drift in Frequency Scalability for Motion-Compensated DCT Coding," IEEE Transactions on Circuits and Systems for Video Technology, pp. 392-406, vol. 4, No. 4, Aug. 1994.

Yu, Haoping, et al., "Block-Based Image Processor for Memory Efficient MPEG Video Decoding," 1999 IEEE International Conference on Consumer Electronics, pp. 114-115, Los Angeles, 1999.

Bao, Jay, et al., "HDTV Down-Conversion Decoder," IEEE Transactions on Consumer Electronics, pp. 402-410, vol. 42, No. 3, Aug. 1996.

Sun, Huifang, et al., "A New Approach for Memory Efficient ATV Decoding," 1997 IEEE International Conference on Consumer Electronics, pp. 174-175, Los Angeles, 1997.

Lee, Dong-Ho, et al., "HDTV Video Decoder Which can be Implemented With Low Complexity," IEEE International Conference on Consumer Electronics, pp. 6-7, 1994.

Sun, Huifang, "Hierarchical Decoder for MPEG Compressed Video Data," IEEE Transactions on Consumer Electronics, pp. 559-564, vol. 39, No. 3, Aug. 1993.

Gersho, Allen, et al., "The Lloyd Quantizer Design Algorithm," Vector Quantization and Signal Compression (The Kluwer International Series in Engineering and Computer Science), Chapter 6: Scaler Quantization II, pp. 188-190, Kluwer Academic Publishers, Boston/Dordrecht/London, Jan. 1992.

* cited by examiner

METHOD AND APPARATUS FOR IMPLEMENTING REDUCED MEMORY MODE FOR HIGH-DEFINITION TELEVISION

CROSS-REFERENCE TO RELATED APPLICATION(S)

The present application is a continuation of U.S. application Ser. No. 10/045,194 filed Oct. 19, 2001 entitled "A Method and Apparatus for Implementing Reduced Memory Mode for High-Definition Television," now U.S. Pat. No. 6,983,017, which claims priority to and the benefit of U.S. Provisional Application No. 60/313,613 filed Aug. 20, 2001 entitled "A Method and Apparatus for Implementing Reduced memory Mode for High-Definition Television," the contents of which are fully incorporated by reference herein. The present application contains subject matter related to the subject matter disclosed in U.S. patent application Ser. No. 09/640,870 entitled "Video and Graphics System with Video Scaling" filed Aug. 18, 2000 and U.S. patent application Ser. No. 09/870,034 entitled "Artifact-Free Decoding of MPEG-2 Video in the Progressive-Refresh Mode" filed May 29, 2001, the contents of both of which are fully incorporated by reference herein. U.S. patent application Ser. No. 09/640,870 corresponds to U.S. Pat. No. 6,768,774 issued Jul. 27, 2004.

FIELD OF THE INVENTION

The Present invention is related to decoding of encrypted digital video stream, and particularly to method and apparatus for reducing memory when decoding HDTV MPEG-2 video stream.

BACKGROUND OF THE INVENTION

MPEG-2 video is used to support both high-definition television (HDTV) and standard-definition television (SDTV). The video frames in HDTV are of higher resolution than those used in present NTSC signals while the video frames of SDTV have approximately the same resolution per frame as the existing analog NTSC standard. Because HDTV provides higher resolution than SDTV, more data is generally required to represent an HDTV frame than is required to represent a corresponding SDTV frame. Accordingly, it is possible to transmit multiple SDTV programs in the same bandwidth required to support a single HDTV program.

For SDTV, MPEG-2 Main Profile at Main Level (MP@ML) specifies various requirements for an MPEG compliant standard definition television signal and associated decoding equipment. MP@ML allows pictures as large as 720×576×1.5 pels (4:2:0) for a total of 622,080 pels per picture. For HDTV, MPEG-2 Main Profile at High Level (MP@HL) allows for pictures as large as 1920×1080×1.5 pels (4:2:0) for a total of 3,110,400 pels per picture.

MPEG-2 video coding employs a motion-compensated discrete cosine transform (DCT) algorithm. The DCT exploits spatial redundancy, and motion compensation exploits temporal redundancy. To perform motion compensation in frame mode, the MPEG-2 video decoder should have a capacity to store two reconstructed frames (e.g., an anchor frame and the currently decoded frame) in the spatial domain. For decoding B-pictures, a third frame buffer is used to store a second anchor frame since B-pictures use a previously reconstructed and displayed frame and a reconstructed but not yet displayed frame as anchor frames for their decoding.

Because of the relatively large amount of data required to represent each HDTV frame, HDTV decoders must support higher data rates than SDTV decoders. The additional memory used by an HDTV decoder, as compared to a standard SDTV decoder, and the increased complexity associated with the inverse DCT circuit and other components of a HDTV decoder, can make an HDTV decoder considerably more expensive than an SDTV decoder.

In the conventional method of obtaining a low-resolution SD image sequence, the HD bitstream is fully decoded and then it is simply pre-filtered and sub-sampled. It is often referred to as a full-resolution decoder with spatial down-conversion. Although the quality is very good, the cost is typically quite high due to the large memory requirement.

In fact, the cost of memory alone may make an HDTV set incorporating an HDTV decoder prohibitively expensive for some consumers. It is expected that a fully MPEG compliant video decoder for HDTV may require a minimum of 10 MB of RAM for frame storage with a practical HDTV decoder probably requiring about 16 MB of relatively expensive Synchronous DRAM.

Therefore, it is desirable to provide a method and apparatus that permits one or more of the following advantages: (1) simplification of the complexity of the circuitry required to implement an HDTV decoder; (2) reduction in the amount of memory required to implement an HDTV decoder circuit; and (3) a single decoder that is capable of decoding both SDTV and HDTV signals. Furthermore, it is desirable that the cost of such a decoder be low enough that it is in a range that would be acceptable to most consumers, e.g., approximately the cost of an SDTV decoder.

SUMMARY OF THE INVENTION

Accordingly, in an embodiment according to the present invention, s video decoding system for receiving a digital bitstream and for decoding the digital bitstream is provided. The video decoding system comprises a video decoder, means for converting, memory and recovery means. The video decoder is used for decoding the digital bitstream to generate a plurality of pictures, each of which is associated with a flag for indicating whether or not the picture is to be reduced in size to picture data prior to being stored. The means for converting is used for converting one or more pictures to picture data. The memory comprises a plurality of buffers. The picture is stored in a buffer as the picture data when the associated flag is armed, and the picture is stored in two or more buffers without size reduction when the associated flag is unarmed. The recovery means is used for recovering the pictures from the picture data and for providing the pictures to the video decoder for use during decoding of the digital bitstream.

In another embodiment of the present invention, a method of decoding a digital bitstream is provided. The digital bitstream is decoded to generate a plurality of pictures, each of which is associated with a flag for indicating whether or not the picture is to be reduced in size to picture data prior to being stored in memory, which comprises a plurality of buffers. One or more pictures are converted to picture data. The picture is stored in a buffer as the picture data when the associated flag is armed. The picture is stored in two or more buffers without size reduction when the associated flag is unarmed. The pictures are recovered from the picture data to be used during decoding of the digital bitstream.

In yet another embodiment of the present invention, a video decoding system for receiving a digital bitstream and for generating a display video stream by decoding the digital bitstream is provided. The video decoding system includes a video decoder, a block-based image compressor, memory and a block-based image decompressor. The video decoder is used for decoding the digital bitstream to generate HDTV pictures, which include one or more anchor pictures. The block-based image compressor is used to compress the anchor pictures in spatial domain using a gain adaptive compression algorithm to generate compressed bits. The memory is used for storing the compressed bits. The block-based image decompressor is used to decompress the compressed bits using a gain adaptive decompression algorithm to generate the anchor pictures. The decompressed anchor pictures are used during the decoding of the digital bitstream.

In still another embodiment of the present invention, a method of generating a display video stream using a digital bitstream is provided. The encrypted digital bitstream is decoded to generate HDTV pictures, which include one or more anchor pictures. The anchor pictures are compressed in spatial domain using a gain adaptive compression algorithm to generate compressed bits. The compressed bits are stored in memory. The compressed bits are decompressed using a gain adaptive decompression algorithm to generate the anchor pictures.

DETAILED DESCRIPTION

In the present invention, a method and apparatus for reducing the complexity of decoder circuitry and video decoder memory requirements are provided. Video decoding techniques may be used to decompress HDTV pictures at approximately the resolution of SDTV pictures, and may be used to decode HDTV and/or SDTV pictures. The video decoding techniques of the present invention may be used as part of a picture-in-picture decoder circuit for providing picture-in-picture capability without providing multiple full-resolution video decoders. The reduction in decoder circuit complexity may be achieved through the use of data reduction techniques including the use of down-conversion/up-conversion and/or block-data recompression.

The present invention provides embodiments related to two options for improving reduced memory mode when implementing in a high definition (HD) decoder. These options are: (1) adaptively enabling reduced memory mode (RMM) with up/down conversion by using the picture-type information; and (2) performing anchor-frame compression/decompression by using adaptive DPCM technique with the picture-type information. By analyzing the trade-off between picture quality and implementation cost, the first option may cost less to implement while the second option may provide better picture quality.

I. Adaptively Enabling the Reduced Memory Mode

Figure 1:
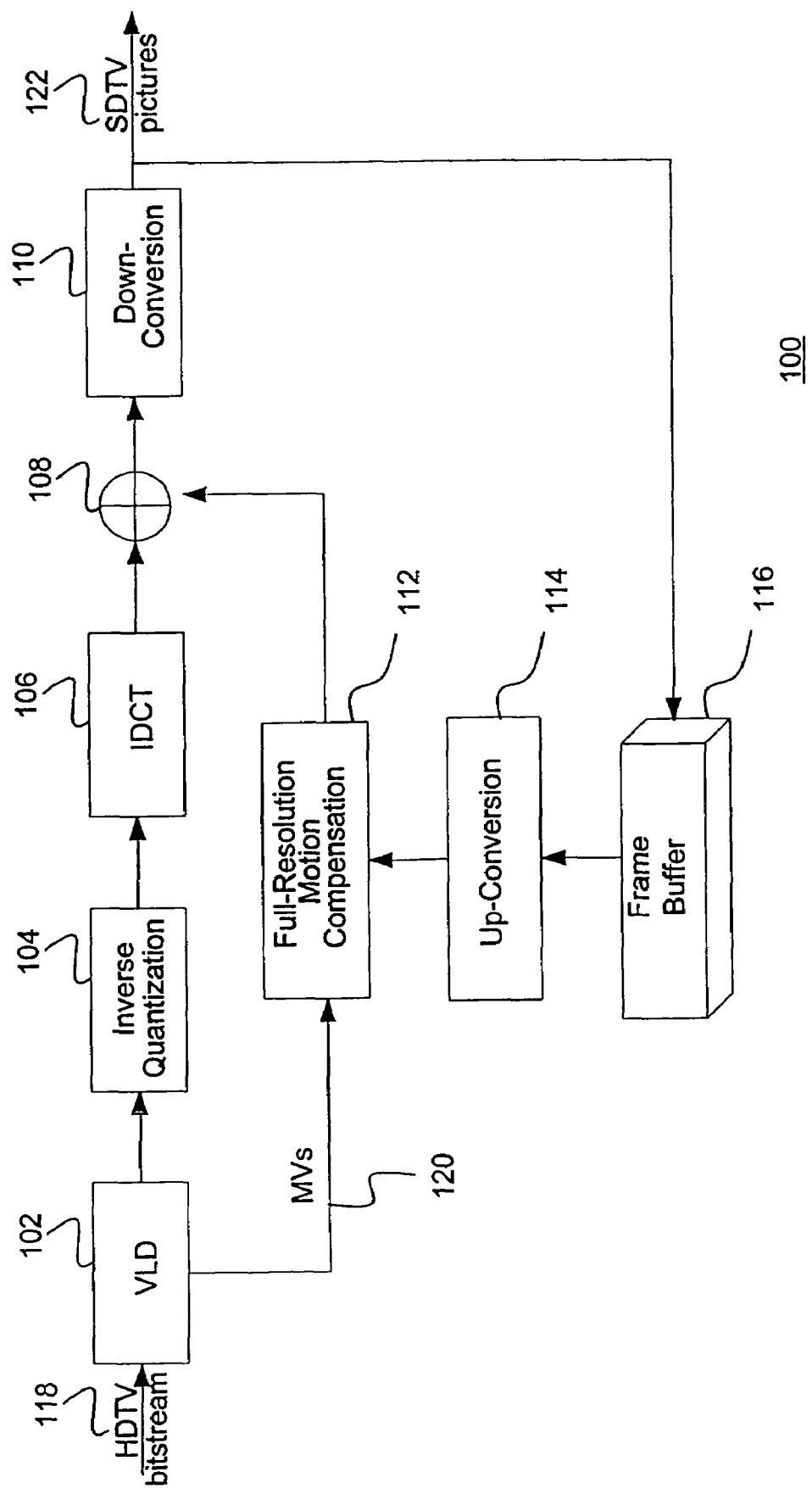
FIG. 1 is a block diagram of a memory-efficient decoder, which may be used to implement an embodiment according to the present invention.

FIG. 1 is a block diagram of a memory-efficient decoder (e.g., an MPEG-2 HD decoder) 100, which may be used to implement an embodiment according to the present invention. The memory-efficient decoder 100 includes a variable length decoder (VLD) (e.g., Huffman decoder) 102, an inverse quantizer (IQTZ) 104, an inverse discrete cosine transformer (ICDT) 106, a summer 108, a down-converter 110, a motion compensator 112, an up-converter 114 and a frame buffer 116, which may comprise a number of frame buffers that are configured and/or accessed in circular fashion.

The VLD 102 receives HDTV bitstream 118, decodes it and provides the decoded bitstream to the IQTZ 104, which inverse quantizes and provides it in the form of DCT coefficients to the IDCT 106. The IDCT 106 inverse cosine transforms the DCT coefficients and provides to the summer 108. The VLD 102 also extracts motion vectors 120 from the HDTV bitstream 118 and provides to the motion compensator 112 for full-resolution motion compensation. The result of the motion compensation from the motion compensator 112 is provided to the summer 108 to be summed with the output of the IDCT 106 to generate full scale HDTV pictures.

For viewing on standard definition television (SDTV), the HDTV pictures are down-converted in the down-converter 110 to SDTV pictures 122. The method and apparatus for down-converting (downscaling) HDTV pictures to SDTV pictures, and vice versa, are known to those skilled in the art.

In other embodiments, the down-conversion may be performed by taking every other horizontal pixel and/or by taking every other vertical pixel for the whole HDTV picture. The down-conversion may also be performed by averaging two adjacent pixels in horizontal and/or vertical direction for the whole HDTV picture. The down-conversion may also be performed using gain-adaptive differential pulse-code modulation (DPCM) algorithm in other embodiments according to the present invention, which is described later. Further, the down-conversion may be performed by any other method known to those skilled in the art for downscaling the picture size by a factor of two or more.

The SDTV pictures 122 (typically just the anchor pictures) are also stored in the frame buffer 116, which may have less storage capacity than frame buffers that are used to store full scale HDTV pictures. Therefore, the memory efficient decoder 100 may be smaller in size and may cost less than HD decoders that store full scale HDTV pictures. The memory efficient decoder 100 may be implemented in a single integrated circuit (IC) chip. In other embodiments, the memory efficient decoder 100 may be implemented using a number of IC chips, discrete components, and/or any combination of hardware, software and firmware.

The frame buffer 116 preferably is the only place where a new interface (in addition to the interfaces in conventional HD decoders with frame buffers for storing full scale HD pictures) is used in this embodiment. The down-converter 110 is applied to the HDTV pictures for down-converting (down-scaling) to store the HDTV pictures as SDTV pictures in the frame buffer 116, and the up-converter 114 is applied to the SDTV pictures for up-converting (upscaling) when the reconstructed pixel values are needed for full-resolution motion compensation (MC) in the motion compensator 112.

In an embodiment according to the present invention, the efficient memory decoder 100 may be used to implement reduced memory mode (RMM) similar to the RMM as disclosed in U.S. patent application Ser. No. 09/640,870 entitled "Video and Graphics System with Video Scaling," the contents of which have been fully incorporated by reference herein. During RMM, horizontal-only down-conversion and up-conversion may be performed to achieve 2:1 or more memory reduction.

In this embodiment, the RMM (when enabled) is implemented as follows. First, the horizontal sub-sampling of the reconstructed anchor pictures (e.g., in the down-converter 110) yields Half-Horizontal Resolution (HHR) pictures (e.g., the SDTV pictures 122). For each horizontal line, pixels in the HHR pictures are generated by averaging (with rounding toward to the nearest integer) of each pair of pixels of the original reconstructed HD pictures. Secondly, for each non-intra macroblock, the motion compensation is performed (e.g., in the motion compensator 112) over the interpolated HHR anchor pictures (e.g. in the up-converter 114). The HHR anchor pictures may also be recreated by horizontal pixel-doubling (or horizontally pixel-repeating).

In an embodiment according to the present invention, the RMM is adaptively enabled by the picture-type Information. For HDTV, MPEG-2 Main Profile at High Level (MP@HL) allows for pictures as large as 1920×1080×1.5 pels (4:2:0) for a total of 3,110,400 pels per picture. Thus, it is expected that a fully MPEG compliant video decoder for HDTV to require a minimum of about 10 MB (i.e. 3,110,400×3) of RAM for frame storage. With the RMM, the frame buffer can be reduced to 3,110,400×2~6.22 MB, i.e. a size of two-frame buffer. For the IP-picture only and P-picture only cases, two-frame buffer size is required for compliant video decoder. Hence, if sequence structure can be detected automatically and frame-buffer memories can be dynamically allocated, the RMM may be accomplished without noticeable quality degradation.

The RMM in this embodiment may be adaptively turned off by using the detected sequence structure such that the RMM can work properly in all commonly-used cases. This adaptive RMM may be described in reference to two cases, a case with frame-structure pictures and a case with field-structure pictures.

Figure 2:
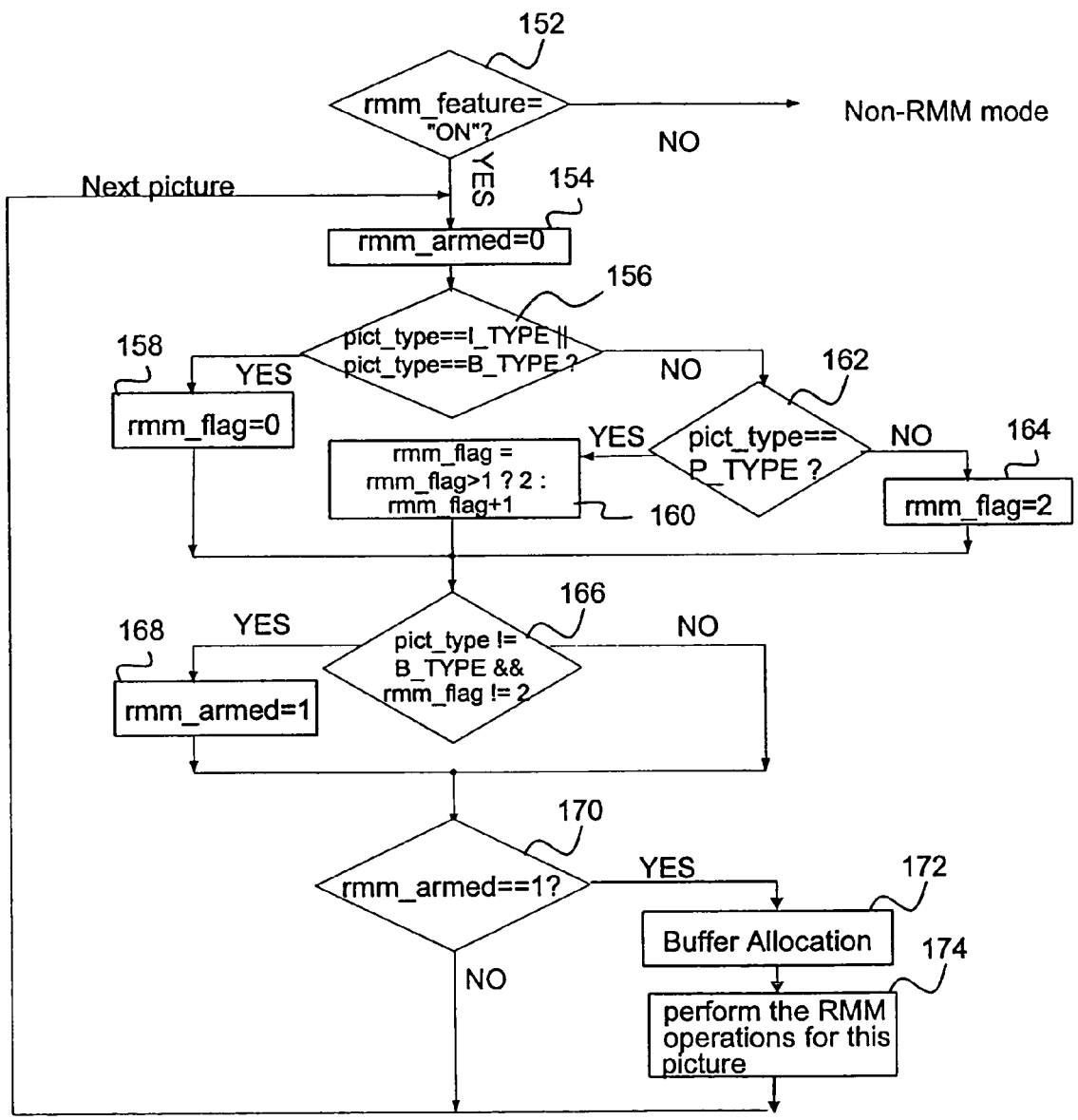
FIG. 2 is a flow diagram of a control flow process of the adaptive RMM for frame-structured picture in an embodiment according to the present invention.

FIG. 2 is a flow diagram of a control flow process 150 of the adaptive RMM for frame-structured picture in an embodiment according to the present invention. For example, the control flow process 150 of FIG. 2 may be implemented in an MPEG-2 decoder, e.g., the memory efficient decoder 100 of FIG. 1, and used to control the RMM mode. The control flow process 150 may be implemented using any combination of hardware, firmware and/or software even though it typically would be implemented using firmware in practice.

It should be noted the control flow process 150 would apply to bitstreams that contain I-pictures as well as P-pictures and/or B-pictures. If a bitstream does not contain I-pictures, for example, if the bitstream is a progressive-refresh bitstream, the control flow process would be slightly different as will be explained below. Examples of progressive-refresh bitstreams are disclosed in U.S. patent application Ser. No. 09/870,034 entitled "Artifact-Free Decoding of MPEG-2 Video in the Progressive-Refresh Mode" filed May 29, 2001, the contents of which have been fully incorporated by reference herein.

In FIG. 2, rmm_feature flag indicates the selection switch of the RMM (whether RMM is available or not). The rmm_feature flag may, for example, be programmed to be "ON" or "OFF" by a manufacturer during fabrication of the MPEG-2 decoder or by a distributor of set top boxes. In other embodiments, the rmm_feature flag may also be turned off and on by a consumer, for example, through a window-based interface. In all cases, the state of the rmm_feature flag may be stored in a register of the MPEG-2 decoder. When the rmm_feature flag is in the "OFF" state, entering the reduced memory mode (RMM) is not even available as an option.

Also in FIG. 2, rmm_armed flag is used to enable/disable (arm/disarm) RMM mode on the fly while receiving and decoding MPEG (e.g., MPEG-2) video stream. In this embodiment, the rmm_armed flag is typically armed at the beginning, on or before the time of receiving the first picture of a video bitstream. This allows activation of the RMM mode at the beginning of the sequence of pictures, in the absence of foreknowledge as to whether the incoming sequence is IBBP type, IPPP type, PPPP type, etc. The rmm_armed flag is temporarily disarmed prior to processing each picture, and remains disarmed if coded sequence configuration of pictures indicate that the RMM mode is to be disarmed; otherwise, the rmm_armed flag is rearmed.

Further, rmm_flag counter in FIG. 2 is used to detect the coded sequence configuration (e.g., in order to determine whether or not to disable the RMM mode). For example, the rmm_flag counter may be used to count the number of P-pictures received in a row, and the RMM mode may be disarmed (i.e., rmm_armed flag is disarmed) when a predetermined number (e.g., two for the case of frame-pictures) of P-pictures are received in a row. Of course, the specific names given to these and/or other flags and counters throughout in reference to the embodiments of the present invention may be different in other embodiments.

The control flow process in step 152 checks whether the RMM mode is available or not by comparing the rmm_feature flag to "ON", which may be logic 0 or logic 1. If the rmm_feature flag is not "ON", non-RMM mode is entered since the RMM mode is not even available for the HD encoder under this condition. If, however, the rmm_feature flag is "ON", the process in step 154 resets the rmm_armed flag to 0 to disarm the RMM mode for the current picture unless and until the control flow 150 determines that the RMM mode should be armed.

In step 156, the process checks whether the picture is an I-frame (intra coded frame) or a B-frame (bi-directional prediction frame). It should be noted that step 156 does not apply to the case where the bitstream does not contain I-pictures since the picture_type is not going to be an I-type in the absence of I-pictures. Instead, in the case of a progressive-refresh bitstream, step 156 should check for a P-picture with a refreshed Intra-slice (I-slice) as the first slice (at the top) since such P-picture-would be the first in a sequence of P-pictures to be decoded. For example, the condition in step 156 in the embodiment where the bitstream does not contain I-pictures (e.g., progressive-refresh bitstream) may be "pict_type == (P_TYPE && (first slice is a refreshed I-slice)) || pict_type ==B_TYPE ?"

Returning now to FIG. 2, if the picture is an I-frame or a B-frame, the rmm_flag counter is initialized to 0 in step 158 to indicate that the current sequence of P-frames in a row has terminated. If, however, the picture is neither an I-frame nor a B-frame, the process in step 162 checks whether the picture is a P-frame (prediction frame).

If the picture is not a P-frame, the rmm_flag counter is set to 2 in step 164 to indicate that the RMM mode should not be armed. This is done for backward compatibility of the MPEG-2 decoder with MPEG-1 bitstreams. For example, an MPEG-1 bitstream may contain one or more D-frames, which are specific to MPEG-1 standard, but are not used in MPEG-2 standard. Thus, in case D-frames are encountered, the control flow process 150 would recognize that the current bitstream is an MPEG-1 bitstream, and would disarm the RMM mode.

If the picture is a P-frame, the process in step 160 checks whether the rmm_flag counter is greater than 1. If the rmm_flag counter is greater than 1, then the rmm_flag counter is assigned 2 as the value. If, however, the rmm_flag counter is not greater than 1, the rmm_flag counter is incremented by 1. Therefore, in step 160, when two or more P-frames are received in a row, the rmm_flag counter becomes 2 and remains at 2.

After either the step 160 (the picture is a P-frame) or the step 164 (the picture is not a P-frame), the process in step 166 checks whether both the picture is not a B-frame and the rmm_flag counter is not equal to 2. If both of these two conditions are met, the rmm_armed flag is set to 1, i.e., the RMM mode is armed. If not, the RMM mode is not armed.

The condition that "the picture not be a B-frame" prevents the rmm_flag from being armed when the current picture is a B-frame. Further, the condition that "the rmm_flag counter not be equal to 2" prevents the rmm_armed flag from being armed when two or more P-frames, including the current picture) have been received in a row.

In step 170 of the process, the rmm_armed flag is compared to 1 to determine whether the RMM mode has been armed or not. If the RMM mode has been armed (i.e., rmm_armed=1), the process in step 172 allocates buffer for RMM mode processing, and the process in step 174 performs RMM operations for the current picture. If, however, the RMM mode has not been armed, the control flow process 150 does not perform the RMM operations. In both cases, the next picture is received afterwards for processing, starting with the resetting of the rmm_armed flag to 0 in step 154 of the control flow process 150.

Figure 3:
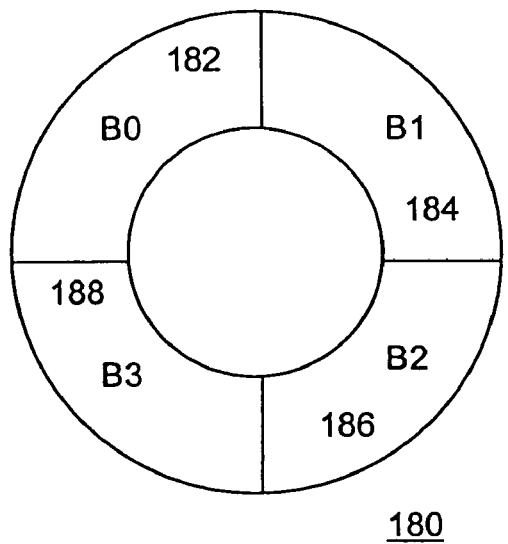
FIG. 3 shows the two-frame buffer in the circular-buffer form, which may be used for prediction/decoding for the adaptive scheme of implementing RMM mode depending on the picture type, in an embodiment according to the present invention.

FIG. 3 shows the two-frame buffer 180 in the circular-buffer form, which may be used for prediction/decoding for the adaptive scheme of implementing RMM mode depending on the picture type, in an embodiment according to the present invention. For example, the two-frame buffer 180 may be used in the frame buffer 116 of FIG. 1. In the two-frame buffer 180, each of $B_0$ 182, $B_1$ 184, $B_2$ 186 and $B_3$ 188 represents a half-frame buffer. Thus, the sum $B_0+B_1+B_2+B_3$ make up the two-frame buffer 180, and sum of any two buffers $B_i+B_j$ may make up a one-frame buffer. The buffer manager flow for the RMM may be as indicated in Table 1 below.

TABLE 1

Buffer Allocation for the RMM with different picture types for frame-structured pictures.

| picture_type | rmm_armed | The half-frame buffer index (modulo 4) for the previous anchor frame | The half-frame buffer index (modulo 4) for the last frame | Buffer Allocation (with subscript index modulo 4) |
|---|---|---|---|---|
| I | 1 | — | i | $B_{i+1}$ |
| P | 0 | i | — | $B_{i+1} + B_{i+2}$ |
|   | 1 | — | i | $B_{i+1}$ |
| B | 0 | i | — | $B_{i+1} + B_{i+2}$ |

When the rmm_armed flag is armed (i.e., rmm_armed=1), the anchor frame is downscaled and thus only one half-frame may be used to store the anchor frame; otherwise, two half-frames are used to store the anchor frame.

To illustrate the buffer-allocation process given in Table 1, two examples are provided as Tables 2 and 3. It should be noted that the video bitstreams of Tables 2 and 3 are in decode order, but not necessarily in display order. For example, in Table 3, the first frame (I-frame) and the second frame (P-frame) are decoded before the following two B-frames. However, these two B-frames may be displayed before the second frame (P-frame).

TABLE 2

Case with I- and P-frames only

|  | I | P | P | P | P | I | P | P | P |  |
|---|---|---|---|---|---|---|---|---|---|---|
| Rmm_armed | 1 | 1 | 0 | 0 | 0 | 1 | 1 | 0 | 0 | ... |
| Buffer Allocation | $B_0$ | $B_1$ | $B_2+B_3$ | $B_0+B_1$ | $B_2+B_3$ | $B_0$ | $B_1$ | $B_2+B_3$ | $B_0+B_1$ | ... |

As can be seen in Table 2, the MPEG-2 video stream has a picture sequence of IPPPPIPPP . . . . It should be noted that when video streams are in the form of IPPPP . . . or PPPP . . . , only two frame buffers are used for normal MPEG video decoding, whereas when B-frames are in the video streams, three frame buffers are used for normal MPEG video decoding. Therefore, when the video streams in the form of IPPP . . . or PPPP . . . are detected, the RMM mode may be disarmed (turned off) until the next I-frame is received. On the other hand, when B-frames are in the video streams, the RMM mode should be armed (turned on) to reduce memory usage.

Perhaps Table 2 can best be described in reference to the control flow process 150 of FIG. 2. Provided that the rmm_feature flag is "ON", when an I-frame is received as a first picture, the rmm_armed flag is initially set to 0 (step 154), the rmm_flag counter is set to 0 (step 158), the rmm_armed flag is reset to 1 (step 168), a half-frame buffer ($B_0$) is allocated for the I-frame (step 172) and the RMM operations are performed for the I-frame (step 174).

When the next picture is a P-frame, the rmm_armed flag is initially set to 0 (step 154), the rmm_flag counter is incremented by one to 1 (step 160), the rmm_armed flag is reset to 1 (step 168), a half-frame buffer ($B_1$) is allocated for the P-frame (step 172) and the RMM operations are performed on the P-frame (step 174).

When the next picture is another P-frame (second P-frame in a row), the rmm_armed flag is initially set to 0 (step 154), the rmm_flag counter is incremented by one to 2 (step 160), and the rmm_armed flag is not reset to 1 (and remains at 0) since now the rmm_flag counter equals to 2 (step 166). Therefore, since the rmm_armed flag is not armed (i.e., rmm_armed flag=0), the RMM mode is not used and two half-frame buffers ($B_2$ and $B_3$) are used to store the second P-frame without downscaling.

When the next picture is yet another P-frame (third P-frame in a row), the rmm_armed flag is initially set to 0 (step 154), the rmm_flag counter remains at 2 (step 160), and the rmm_armed flag is not reset to 1 (and remains at 0) since now the rmm_flag counter equals to 2 (step 166). Therefore, since the rmm_armed flag is not armed (i.e., rmm_armed flag=0), the RMM mode is not used and two half-frame buffers ($B_0$ and $B_1$) are used to store the third P-frame without downscaling. This is repeated with the fourth P-frame in a row, except that now half-frame buffers $B_2$ and $B_3$ are used to store the fourth P-frame.

When the next picture is an I-frame, the string of P-frames ends, the rmm_flag counter is set to 0 (step 158), and the rmm_armed flag is armed once again (step 168). With the RMM mode armed (rmm_armed=1), a half-frame buffer ($B_0$) is allocated for the I-frame (step 172) and the RMM operations are performed for the I-frame (step 174).

Thereafter, arming and disarming of the RMM mode continue as described above for the case of IPPPPIPPP . . . in the decode order illustrated in Table 2. For the control flow process 150 of FIG. 2, when the video stream contains I-frames and P-frames of Table 2, 1) the RMM mode is armed for the I-frames, and every first P-frame following any I-frame, and 2) the RMM mode is disarmed for every second P-frame in a row and thereafter until the next I-frame is received.

Unlike the MPEG-2 video stream of Table 2, the MPEG-2 video stream in Table 3 includes B-frames as well as I- and P-frames in a picture sequence of IPBBPBBPB . . . in decode order. Perhaps Table 3 also can best be described in reference to the control flow process 150 of FIG. 2. Provided that the rmm_feature flag is "ON", when an I-frame is received as the first picture, the rmm_armed flag is initially set to 0 (step 154), the rmm_flag counter is set to 0 (step 158), the rmm_armed flag is reset to 1 (step 168), a half-frame buffer ($B_0$) is allocated for the I-frame (step 172) and the RMM operations are performed for the I-frame (step 174).

When the next picture is a P-frame, the rmm_armed flag is initially set to 0 (step 154), the rmm_flag counter is incremented by one to 1 (step 160), the rmm_armed flag is reset to 1 (step 168), a half-frame buffer ($B_1$) is allocated for the P-frame (step 172) and the RMM operations are performed on the P-frame (step 174).

When the next picture is a B-frame, it is decoded using the first and second pictures, the I- and P-frames in the half-frame buffers $B_0$ and $B_1$, respectively, as anchor pictures. The rmm_armed flag is initially set to 0 (step 154), the rmm_flag counter is set to 0 (step 158), and the rmm_armed flag is not reset to 1 (and remains at 0) since the current pictures is a B-frame (step 166). Therefore, since the rmm_armed flag is not armed (i.e., rmm_armed flag=0), the RMM mode is not used, and two half-frame buffers ($B_2$ and $B_3$) are used to store the B-frame without downscaling.

When the next picture is another B-frame, the rmm_armed flag is initially set to 0 (step 154), the rmm_flag counter remains at 0 (step 158), and the rmm_armed flag is not reset to 1 (and remains at 0) since the current picture is a B-frame (step 166). Therefore, since the rmm_armed flag is not armed (i.e., rmm_armed flag=0), the RMM mode is not used and two half-frame buffers ($B_2$ and $B_3$) are used to store the second B-frame without downscaling.

It should be noted that the half-frame buffers $B_2$ and $B_3$ are used even though they were just used for the previous picture (the first B-frame) so that the I- and P-frames stored in the half-frame buffers $B_0$ and $B_1$ can be used as anchor pictures for this and any subsequent consecutive B-frames. Further, the P-frame in the half-frame buffer $B_1$ is yet to be displayed and it should not be overwritten.

When the next picture is a P-frame, the rmm_armed flag is initially set to 0 (step 154), the rmm_flag counter is incremented by one to 1 (step 160), the rmm_armed flag is reset to 1 (step 168), a half-frame buffer ($B_0$) is allocated for the P-frame (step 172) and the RMM operations are performed on the P-frame (step 174).

When the next picture is a B-frame, it is decoded using the second and fifth pictures, the P-frames in the half-frame buffers $B_1$ and $B_0$, respectively, as anchor pictures. The rmm_armed flag is initially set to 0 (step 154), the rmm_flag counter is set to 0 (step 158), and the rmm_armed flag is not reset to 1 (and remains at 0) since the current pictures is a B-frame (step 166). Therefore, since the rmm_armed flag is not armed (i.e., rmm_armed flag=0), the RMM mode is not used, and two half-frame buffers ($B_2$ and $B_3$) are used to store the B-frame without downscaling.

TABLE 3

| Case with Two Adjacent B-frames | | | | | | | | | |
|---|---|---|---|---|---|---|---|---|---|
| | I | P | B | B | P | B | B | P | B | |
| rmm_armed | 1 | 1 | 0 | 0 | 1 | 0 | 0 | 1 | 0 | ... |
| Buffer Allocation | $B_0$ | $B_1$ | $B_2+B_3$ | $B_2+B_3$ | $B_0$ | $B_2+B_3$ | $B_2+B_3$ | $B_1$ | $B_2+B_3$ | ... |

When the next picture is another B-frame, the rmm_armed flag is initially set to 0 (step 154), the rmm_flag counter remains at 0 (step 158), and the rmm_armed flag is not reset to 1 (and remains at 0) since the current picture is a B-frame (step 166). Therefore, since the rmm_armed flag is not armed (i.e., rmm_armed flag=0), the RMM mode is not used and two half-frame buffers ($B_2$ and $B_3$) are used to store the second B-frame without downscaling.

Thereafter, arming and disarming of the RMM mode continue as described above for the case of IPBBPBBPB ... in the decode order illustrated in Table 3. For the control flow process 150 of FIG. 2, when the video bitstream contains I-frames, P-frames and B-frames of Table 3, 1) the RMM mode is armed for the I-frames, and every first P-frame following an I-frame or a B-frame, and 2) the RMM mode is disarmed for every B-frame.

Figure 4:
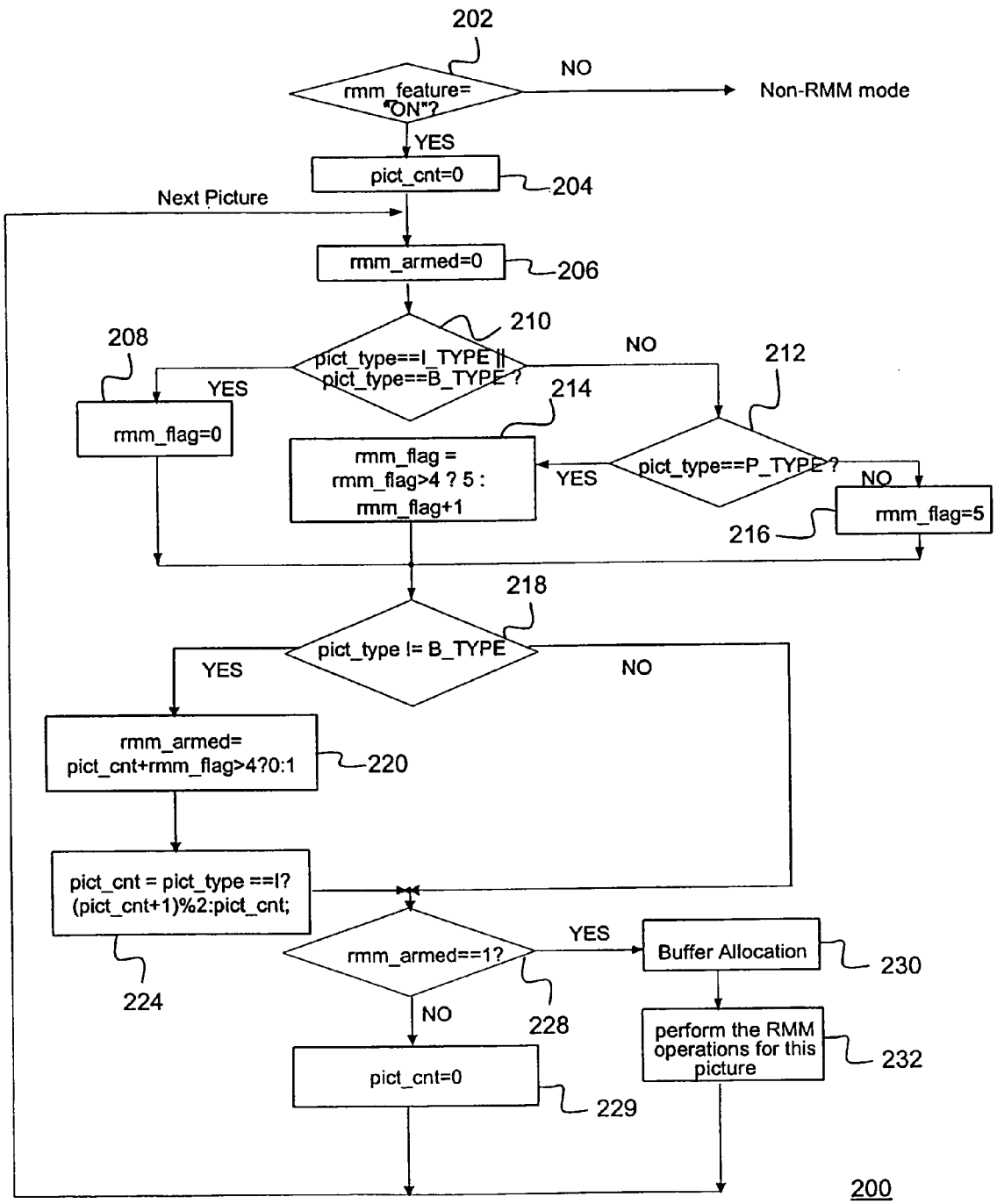
FIG. 4 is a flow diagram of a control flow process of the adaptive RMM for field-structured pictures in an embodiment according to the present invention.

FIG. 4 is a flow diagram of a control flow process 200 of the adaptive RMM for field-structured pictures in an embodiment according to the present invention. The control flow process 200 may be implemented using any combination of hardware, software and/or firmware, even though it typically would be implemented using firmware in practice.

It should be noted the control flow process 200 would apply to bitstreams that contain I-pictures as well as P-pictures and/or B-pictures. If a bitstream does not contain I-pictures, for example, if the bitstream is a progressive-refresh bitstream, the control flow process would be slightly different as will be explained below. Examples of progressive-refresh bitstreams are disclosed in U.S. patent application Ser. No. 09/870,034 entitled "Artifact-Free Decoding of MPEG-2 Video in the Progressive-Refresh Mode" filed May 29, 2001, the contents of which have been fully incorporated by reference herein.

It should also be noted that when using field-structured pictures, four fields (i.e. two frames) of memories are normally used for I- and/or P-field-only bitstreams while five fields (i.e. two and half frames) of memories are normally used for I-, P-, and B-field type of bitstreams. Thus, the adaptive RMM for the field-structured pictures preferably result in memory savings of one field for bitstreams that contain B-field pictures. It should also be noted that the rmm_armed flag may be armed in two fields among any four adjacent anchor fields for bitstreams, which contain B-field pictures.

The rmm_feature flag and the rmm_armed flag are similar to the case of the frame-structured pictures as described in reference to FIG. 2. The rmm_flag counter preferably is used to count the number of P-fields received without any intervening I-fields or B-fields.

In step 202 of the control flow process 200, the process checks whether the RMM feature should be used by comparing the rmm_feature flag against "ON". If the rmm_feature flag is not "ON", the RMM mode is not used, and non-RMM mode is entered for any of the pictures until it is turned on (e.g., by a viewer using window-type interface). In practice, the rmm_feature flag is typically turned on during manufacturing of the MPEG decoder chip or the set top box and may not be accessible to the viewer to turn it off and on.

If the rmm_feature flag is "ON", the process in step 204 resets pict_cnt (picture count) counter to 0. The pict_cnt counter is used to count modulo 2 (MOD 2) of the number of I-fields, without disarming the RMM mode, received by the MPEG-2 decoder. Similar to the case of decoding frame-type pictures, the rmm_armed flag is armed (i.e., rmm_armed flag=1) in the beginning prior to receiving the first picture in the video bitstream. The process in step 206 resets the rmm_armed to 0 so that the RMM mode is not armed (turned off).

In step 210, the process checks whether the picture is an I-field (intra coded field) or a B-field (bi-directional prediction field). It should be noted that step 210 does not apply to the case where the bitstream does not contain I-pictures since the picture-type is not going to be an I-type in the absence of I-pictures. In stead, in the case of a progressive-refresh bitstream, step 210 should check for a P-picture with a refreshed I-slice as the first slice (at the top) since such P-picture would be the first in a sequence of P-pictures to be decoded. For example, the condition in step 210 in the embodiment where the bitstream does not contain I-pictures (e.g., progressive-refresh bitstream) may be "pict_type == (P-TYPE && (first slice is a refreshed I-slice)) || pict_type == B_TYPE ?"

Returning now to FIG. 4, if the picture is an I-field or a B-field, the rmm_flag counter is initialized to 0 in step 208 to indicate that the current sequence of P-fields in a row has terminated. If, however, the picture is neither an I-field nor a B-field, the process in step 212 checks whether the picture is a P-field (prediction field).

If the picture is not a P-field, the rmm_flag counter is set to 5 in step 216 to indicate that the RMM mode should not be armed. This is done for backward compatibility of the MPEG-2 decoder with MPEG-1 bitstreams. For example, an MPEG-1 bitstream may contain one or more D-fields, which are specific to MPEG-1 standard, but are not used in MPEG-2 standard. Thus, in case D-fields are encountered, the control flow process 200 would recognize that the current bitstream is an MPEG-1 bitstream, and would disarm the RMM mode.

If the picture is a P-field, the process in step 214 checks whether the rmm_flag counter is greater than 4. If the rmm_flag counter is greater than 4, then the rmm_flag counter is assigned 5 as the value. If, however, the rmm_flag counter is not greater than 4, the rmm_flag counter is incremented by 1. Therefore, in step 214, when five or more P-fields are received in a row, the rmm_flag counter becomes 5 and remains at 5.

After either step 214 (the picture is a P-field) or step 208 (the picture is not a P-field), the process in step 218 checks whether the picture is not a B-field. If the picture is a B-field, the rmm_armed flag is not armed prior to when the process compares the rmm_armed flag to 1 in step 228 to check whether the RMM mode has been armed or not. Since the rmm_armed flag is not reset to 1 when the picture is a B-field, the RMM mode is not armed (turned on), and the B-field is stored in the frame buffer without being downscaled. Then in step 229, the pict_cnt counter is reset to 0.

When the picture is not a B-field and the picture is an I-field, the rmm_armed flag is set to 1 in step 220 to indicate arming of the RMM mode if the sum of the pict_cnt counter and the rmm_flag counter is greater than 4. Otherwise, the rmm_armed flag is set to (remains at) 0, and the RMM mode is not armed. Then in step 224, the pict_cnt counter is incremented by 1, then modulo 2 (MOD 2) is taken and assigned to the pict_cnt counter. On the other hand, if the picture is a P-picture, the pict_cnt counter is not incremented.

After one of the steps 218 (in case the picture is a B-picture) and 224, the process in step 228 checks whether the RMM mode has been armed by comparing the rmm_armed flag to 1. If the rmm_armed flag is equal to 0 (i.e., RMM mode has not been armed), the pict_cnt counter is reset to 0 in step 229. If the rmm_armed flag is equal to 1 (i.e., RMM mode has been armed), buffers are allocated in step 230 and the RMM operations are performed for the picture in step 232. If, however, the rmm_armed flag is not equal to 1, steps 230 and 232 are not performed. Then, the process repeats for the next picture, starting with resetting of the rmm_armed flag to 0 in step 206.

Figure 5:
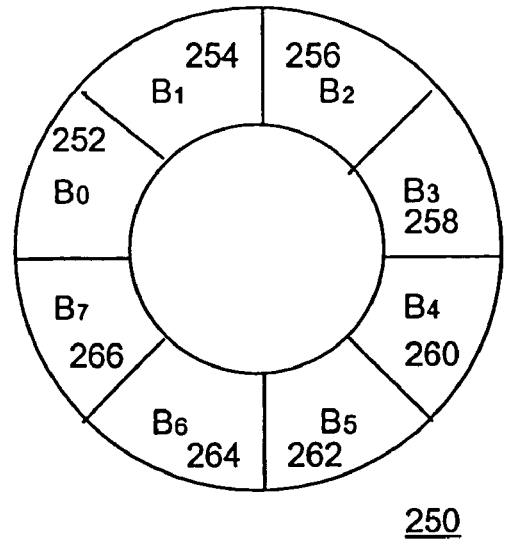
FIG. 5 is a block diagram of a four-field buffer in circular-buffer form, which is managed as the buffer for the adaptive RMM mode for prediction/decoding in an embodiment according to the present invention.

FIG. 5 is a block diagram of a four-field buffer 250 in circular-buffer form, which is managed as the buffer for the adaptive RMM mode for prediction/decoding in an embodiment according to the present invention. For example, the four-field buffer 250 may be used in the frame buffer 116 when the memory efficient decoder 100 is used to decode field-type MPEG-2 video bitstreams in the RMM mode. Of course, the frame buffer 116 may be apportioned differently to include either the two-frame buffer 180 or the four-field buffer 250 depending on the mode of operation (frame-type or field-type) of the memory efficient decoder 100 of FIG. 1.

In FIG. 5, the half-field buffers $B_0$ 252, $B_1$ 254, $B_2$ 256, $B_3$ 258, $B_4$ 260, $B_5$ 262, $B_6$ 264 and $B_7$ 266 make up the circular four-field buffer 250. The sum of any two half-field buffers $B_i + B_j$ is one-field buffer. Table 4 is the buffer manager flow for the RMM.

rmm_feature flag is "ON", when an I-field (top field) is received as a first picture, the pict_cnt counter is initially set to 0 (step 204), the rmm_armed flag is initially set to 0 (step 206), the rmm_flag counter is set to 0 (step 208), the rmm_armed flag is set to 1 (step 220) since the sum of pict_cnt counter (=0) and the rmm_flag counter (=0) is 0, which is not greater than 4, and the pict_cnt counter is incremented by one to 1 (step 224). Therefore, since the rmm_armed flag is armed (i.e., rmm_armed flag=1), the RMM mode is used, and one half-field buffer ($B_0$) is used to store the I-field (first picture) after downscaling.

When the next picture is a P-field (bottom field), the rmm_armed flag is initially set to 0 (step 206), the rmm_flag

TABLE 4

Buffer Allocation for the RMM with different picture types for field-structured pictures.

| Picture_type (for a field) | rmm_armed | The field buffer index (modulo 8) for the latest anchor field | The field buffer index (modulo 8) for the last field | Buffer Allocation (with subscript index modulo 8) |
|---|---|---|---|---|
| I | 1 | — | i | $B_{i+1}$ |
| P | 0 | i | — | $B_{i+1} + B_{i+2}$ |
|   | 1 | — | i | $B_{i+1}$ |
| B | 0 | i | — | $B_{i+1} + B_{i+2}$ |

When the rmm_armed flag is armed (i.e., rmm_armed=1), the anchor picture is downscaled and thus only one half-field may be used to store the anchor field; otherwise, two half-fields are used to store the anchor field.

To illustrate the buffer-allocation process given in Table 4, two examples are provided as Tables 5 and 6. Tables 5 and 6, respectively, illustrate two examples of the buffer-allocation process for I- and P-pictures only and two adjacent B-picture field cases in an embodiment according to the present invention. It should be noted that the video bitstreams of Tables 5 and 6 are in decode order, but not necessarily in display order. For example, in Table 6, the third and fourth fields (P-fields) are decoded before the following two B-fields (fifth and sixth fields). However, these two B-fields may be displayed before the third and fourth fields.

counter is incremented by one to 1 (step 214), the rmm_armed flag is set to 1 (step 220) since the sum of the pict_cnt counter (=1) and the rmm_flag counter (=1) is 2, which is not greater than 4, and the pict_cnt counter is not incremented (step 224). Therefore, since the rmm_armed flag is armed (i.e., rmm_armed flag=1), the RMM mode is used, and one half-field buffer ($B_1$) is used to store the P-field (second picture) after downscaling.

When the next picture is another P-field (top field), the rmm_armed flag is initially set to 0 (step 206), the rmm_flag counter is incremented by one to 2 (step 214), the rmm_armed flag is set to 1 (step 220) since the sum of the pict_cnt counter (=1) and the rmm_flag counter (=2) is 3, which is not greater than 4, and the pict_cnt counter is not incremented (step 224). Therefore, since the rmm_armed flag is armed (i.e.,

TABLE 5

The case with I- and P-pictures only

|  | I | P | P | P | P | P | I | P | P |  |
|---|---|---|---|---|---|---|---|---|---|---|
| rmm_armed | 1 | 1 | 1 | 1 | 0 | 0 | 1 | 1 | 1 | ... |
| Buffer Allocation | $B_0$ | $B_1$ | $B_2$ | $B_3$ | $B_4 + B_5$ | $B_6 + B_7$ | $B_0$ | $B_1$ | $B_2$ | ... |

As can be seen in Table 5, the MPEG-2 video stream can have a picture sequence of IPPPPPIPP . . . . It should be noted that when video streams are in the form of IPPPP . . . or PPPP . . . (only I- and P-fields), only four field buffers are used for normal MPEG video decoding, whereas when B-fields are in the video streams, five field buffers are used for normal MPEG video decoding. Therefore, when the video streams include only I- and P-fields, the RMM mode may be disarmed (turned off). On the other hand, when B-fields are in the video streams, the RMM mode should be armed (turned on) to reduce memory usage.

Perhaps Table 5 can best be described in reference to the control flow process 200 of FIG. 4. Provided that the rmm_armed flag=1), the RMM mode is used, and one half-field buffer ($B_2$) is used to store the P-field (third picture) after downscaling.

When the next picture is yet another P-field (bottom field), the rmm_armed flag is initially set to 0 (step 206), the rmm_flag counter is incremented by one to 3 (step 214), the rmm_armed flag is set to 1 (step 220) since the sum of the pict_cnt counter (=1) and the rmm_flag counter (=3) is 4, which is not greater than 4, and the pict_cnt counter is not incremented (step 224). Therefore, since the rmm_armed flag is armed (i.e., rmm_armed flag=1), the RMM mode is used, and one half-field buffer ($B_3$) is used to store the P-field (fourth picture) after downscaling.

When the next picture is yet another P-field (top field), the rmm_armed flag is initially set to 0 (step 206), the rmm_flag counter is incremented by one to 4 (step 214), the rmm_armed flag remains at 0 (step 220) since the sum of the pict_cnt counter (=1) and the rmm_flag counter (=4) is 5, which is greater than 4, and the pict_cnt counter is not incremented (step 224). Therefore, since the rmm_armed flag is not armed (i.e., rmm_armed flag=0), the RMM mode is not used, and two half-field buffers ($B_4$ and $B_5$) are used to store the P-field (fifth picture) without downscaling. Then, the pict_cnt counter is reset to 0 (step 229).

When the next picture is still another P-field (bottom field), the rmm_armed flag is initially set to 0 (step 206), the rmm_flag counter is incremented by one to 5 (step 214), the rmm_armed flag remains at 0 (step 220) since the sum of the pict_cnt counter (=0) and the rmm_flag counter (=5) is 5, which is greater than 4, and the pict_cnt counter is not incremented (step 224). Therefore, since the rmm_armed flag is not armed (i.e., rmm_armed flag=0), the RMM mode is not used, and two half-field buffers ($B_6$ and $B_7$) are used to store the P-field (sixth picture) without downscaling. The pict_cnt counter remains at 0 (step 229).

When the next picture is an I-field (top field), the rmm_armed flag is initially set to 0 (step 206), the rmm_flag counter is reset to 0 (step 208), the rmm_armed flag is set to 1 (step 220) since the sum of the pict_cnt counter (=0) and the rmm_flag counter (=0) is 0, which is not greater than 4, and the pict_cnt counter is set to 1 (step 224). Therefore, since the rmm_armed flag is armed (i.e., rmm_armed flag=1), the RMM mode is used, and one half-field buffer ($B_0$) is used to store the I-field (seventh picture) after downscaling.

Thereafter, arming and disarming of the RMM mode continue as described above for the case of IPPPPPIPP . . . in the decode order illustrated in Table 5. For the control flow process 200 of FIG. 4, when the video bitstream contains I-fields and P-fields of Table 6, the RMM mode is armed for: 1) the I-fields; 2) up to three continuous P-fields following an I-field when a frame has an I-field as a top field and a P-field as a bottom field; and 3) up to four continuous P-fields when the first P-field of the sequence is a top field.

When the next picture is a P-field (bottom field), the rmm_armed flag is initially set to 0 (step 206), the rmm_flag counter is incremented by one to 1 (step 214), the rmm_armed flag is set to 1 (step 220) since the sum of the pict_cnt counter (=1) and the rmm_flag counter (=1) is 2, which is not greater than 4, and the pict_cnt counter is not incremented (step 224). Therefore, since the rmm_armed flag is armed (i.e., rmm_armed flag=1), the RMM mode is used, and one half-field buffer ($B_1$) is used to store the P-field (second picture) after downscaling.

When the next picture is another P-field (top field), the rmm_armed flag is initially set to 0 (step 206), the rmm_flag counter is incremented by one to 2 (step 214), the rmm_armed flag is set to 1 (step 220) since the sum of the pict_cnt counter (=1) and the rmm_flag counter (=2) is 3, which is not greater than 4, and the pict_cnt counter is not incremented (step 224). Therefore, since the rmm_armed flag is armed (i.e., rmm_armed flag=1), the RMM mode is used, and one half-field buffer ($B_2$) is used to store the P-field (third picture) after downscaling.

When the next picture is yet another P-field (bottom field), the rmm_armed flag is initially set to 0 (step 206), the rmm_flag counter is incremented by one to 3 (step 214), the rmm_armed flag is set to 1 (step 220) since the sum of the pict_cnt counter (=1) and the rmm_flag counter (=3) is 4, which is not greater than 4, and the pict_cnt counter is not incremented (step 224). Therefore, since the rmm_armed flag is not armed (i.e., rmm_armed flag=0), the RMM mode is used, and one half-field buffers ($B_3$) is used to store the P-field (fourth picture) after downscaling.

When the next picture is a B-field (top field), the rmm_armed flag is initially set to 0 (step 206), and the rmm_flag counter is reset to 0 (step 208). Since the rmm_armed flag is not set to 1, the process in step 228 determines that the RMM mode is not to be entered, and the pict_cnt counter is reset to 0 (step 229). Therefore, two half-field buffers ($B_4$ and $B_5$) are used to store the B-field (fifth picture) without downscaling.

When the next picture is another B-field (bottom field), the rmm_armed flag is initially set to 0 (step 206), and the

TABLE 6

| The case with Two Adjacent B-picture fields | | | | | | | | | |
|---|---|---|---|---|---|---|---|---|---|
| I | P | P | P | B | B | P | P | B | ... |
| rmm_armed | 1 | 1 | 1 | 1 | 0 | 0 | 1 | 1 | 0 | ... |
| Buffer Allocation | $B_0$ | $B_1$ | $B_2$ | $B_3$ | $B_4 + B_5$ | $B_6 + B_7$ | $B_0$ | $B_1$ | $B_2 + B_3$ | ... |

As can be seen in Table 6, the MPEG-2 video stream can have a picture sequence of IPPPBBPPB . . . . Perhaps Table 6 also can best be described in reference to the control flow process 200 of FIG. 4. Provided that the rmm_feature flag is "ON", when an I-field (top field) is received as a first picture, the pict_cnt counter is initially set to 0 (step 204), the rmm_armed flag is initially set to 0 (step 206), the rmm_flag counter is set to 0 (step 208), the rmm_armed flag is set to 1 (step 220) since the sum of the pict_cnt counter (=0) and the rmm_flag counter (=0) is 0, which is not greater than 4, and the pict_cnt counter is incremented by one to 1 (step 224). Therefore, since the rmm_armed flag is armed (i.e., rmm_armed flag=1), the RMM mode is used, and one half-field buffer ($B_0$) is used to store the I-field (first picture) after downscaling.

rmm_flag counter is reset to 0 (step 208). Since the rmm_armed flag is not set to 1, the process in step 228 determines that the RMM mode is not to be entered, and the pict_cnt counter is reset to 0 (step 229). Therefore, two half-field buffers ($B_6$ and $B_7$) are used to store the B-field (sixth picture) without downscaling.

When the next picture is a P-field (top field), the rmm_armed flag is initially set to 0 (step 206), the rmm_flag counter is incremented by one to 1 (step 214), the rmm_armed flag is set to 1 (step 220) since the sum of the pict_cnt counter (=0) and the rmm_flag counter (=1) is 1, which is not greater than 4, and the pict_cnt counter is not incremented (step 224). Therefore, since the rmm_armed flag is armed (i.e., rmm_armed flag=1), the RMM mode is used, and one half-field buffer ($B_0$) is used to store the P-field (seventh picture) after downscaling.

Thereafter, arming and disarming of the RMM mode continue as described above for the case of IPPPBBPPB . . . in the decode order illustrated in Table 6. For the control flow process 200 of FIG. 4, when the video bitstream contains I-fields, P-fields and B-fields of Table 6, the RMM mode is armed for: 1) I-fields; 2) up to three continuous P-fields following an I-field when a frame has an I-field as a top field and a P-field as a bottom field; 3) up to four continuous P-fields when the first P-field of the sequence is a top field; 4) and B-fields.

II. Anchor-Frame Compression/De-Compression by Using Adaptive DPCM Technique

In an alternate embodiment of the present invention, the reduced memory mode (RMM) preferably is implemented by performing re-compression and decompression of anchor frames. In this alternate embodiment, block-based image compressor is applied to achieve the RMM. In particular, a gain-adaptive multiple-codebook differential pulse-code modulation (DPCM) algorithm preferably is used to achieve memory reduction in the RMM mode.

In DPCM, blocks of pixels, e.g., blocks of 16×16 pixels are reduced in size, for example, to blocks of 16×8 pixels. In most cases, pixels in the 16×16 block of a picture are correlated since intensity of adjacent pixels are similar unless there is a boundary between them. In DPCM, differences between adjacent pixels are taken, quantized and coded. By saving the quantization level of the difference rather than the difference, memory can be saved. For example, if the difference in intensity is 64, it would take 6 bits to store the difference. However, if the difference is quantized to 8 levels and the quantization level is stored, only 3 bits may be used. In DPCM, a quantization table, which may be referred to as a PCM table or a codebook, is used to generate the quantization level from the intensity difference between two adjacent pixels.

A. The Gain-Adaptive Differential Pulse-Code Modulation (DPCM) Algorithm for the RMM In this embodiment of the present invention, memory reduction is achieved by applying a block-based data compression technique in the anchor frames. The data compression preferably is accomplished in the spatial domain by a gain-adaptive DPCM algorithm with a pre-determined predictor and several pre-trained quantization tables. The quantization tables are adaptively selected based on the magnitude of the data (e.g., intensity difference between adjacent pixels) to be quantized. This way, the quantization levels are scaled based on the magnitude of the data to be quantized. For example, the quantization tables (codebooks) may be made available to both the encoder and the decoder, so that only codebook indices may then be coded and transmitted rather than data itself so that less number of bits may be transmitted.

Figure 6:
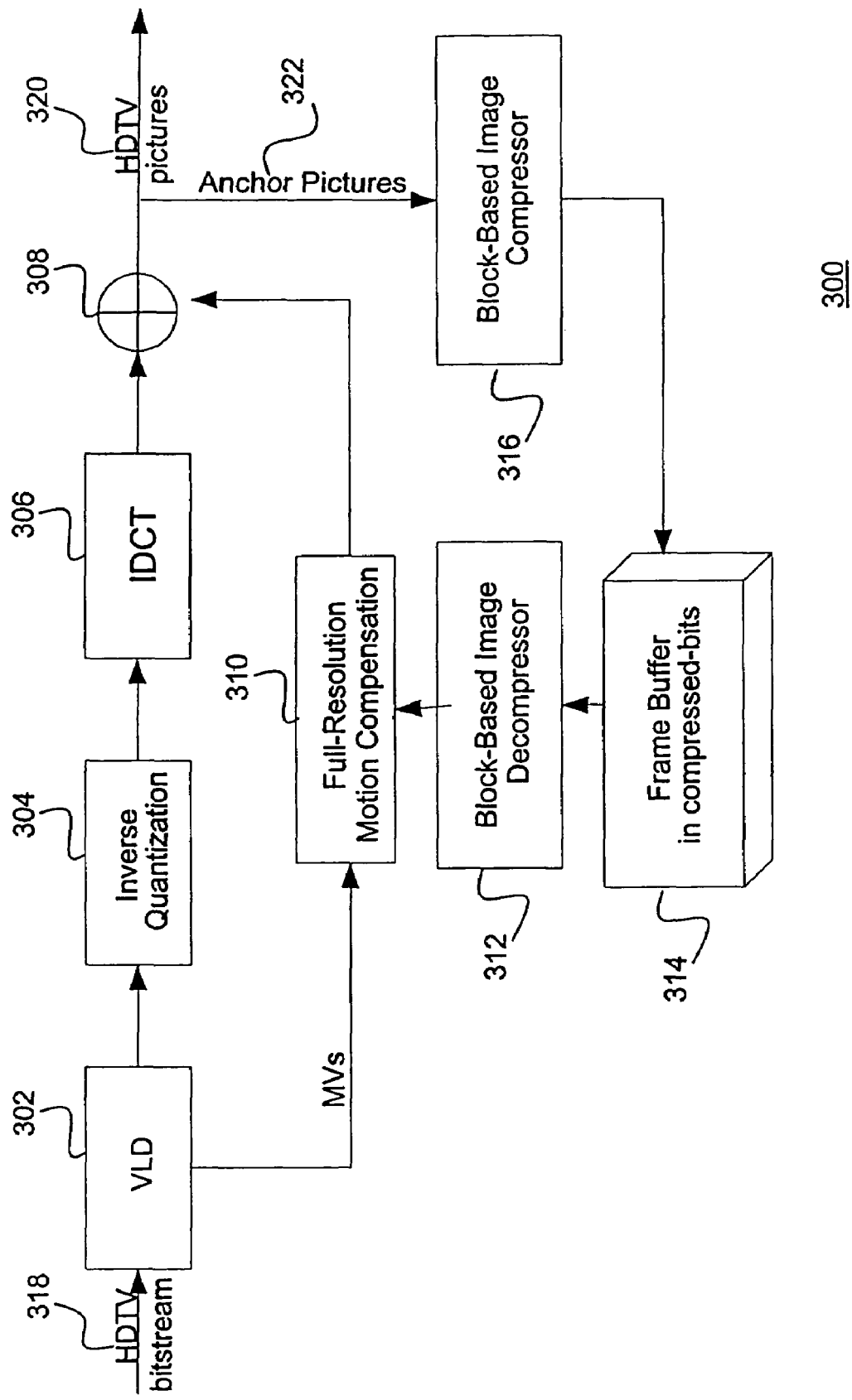
FIG. 6 is a block diagram of a memory efficient decoder 300, which may be used to implement an alternate embodiment according to the present invention.

FIG. 6 is a block diagram of a memory efficient decoder 300, which may be used to implement this alternate embodiment according to the present invention. The memory efficient decoder 300 includes a variable length decoder (VLD) (e.g., Huffman decoder) 302, an inverse quantizer (IQTZ) 304, an inverse discrete cosine transformer (ICDT) 306, a summer 308, a motion compensator 310, a block-based image decompressor 312 a frame buffer 314 and a block-based image compressor 316.

The VLD 302 receives HDTV bitstream 318, decodes it and provides the decoded bitstream to the IQTZ 304, which inverse quantizes and provides it in the form of DCT coefficients to the IDCT 306. The IDCT 306 inverse cosine transforms the DCT coefficients and provides it to the summer 308. The VLD 302 also extracts motion vectors (MVs) from the HDTV bitstream 318 and provides to the motion compensator 310 for full-resolution motion compensation. The result of the motion compensation from the motion compensator 310 is provided to the summer 308 to be summed with the output of the IDCT 306 to generate full scale HDTV pictures.

For viewing on high definition television (HDTV), the HDTV pictures 320 are provided. Of the HDTV pictures 320, anchor pictures 322 are also provided to the block-based image compressor 316 for compression prior to being stored in the frame buffer in compressed bits. The frame buffer 314 may have less storage capacity than frame buffers that are used to store uncompressed/decompressed HDTV pictures. Therefore, the memory efficient decoder 300 may be smaller in size and cost less than conventional HD decoders with a frame buffer for storing full scale HDTV pictures. For full-resolution motion compensation in the motion compensator 310, the block-based image decompressor 312 decompresses the compressed HDTV pictures stored in the frame buffer 314 in the form of compressed bits.

Figure 7A:
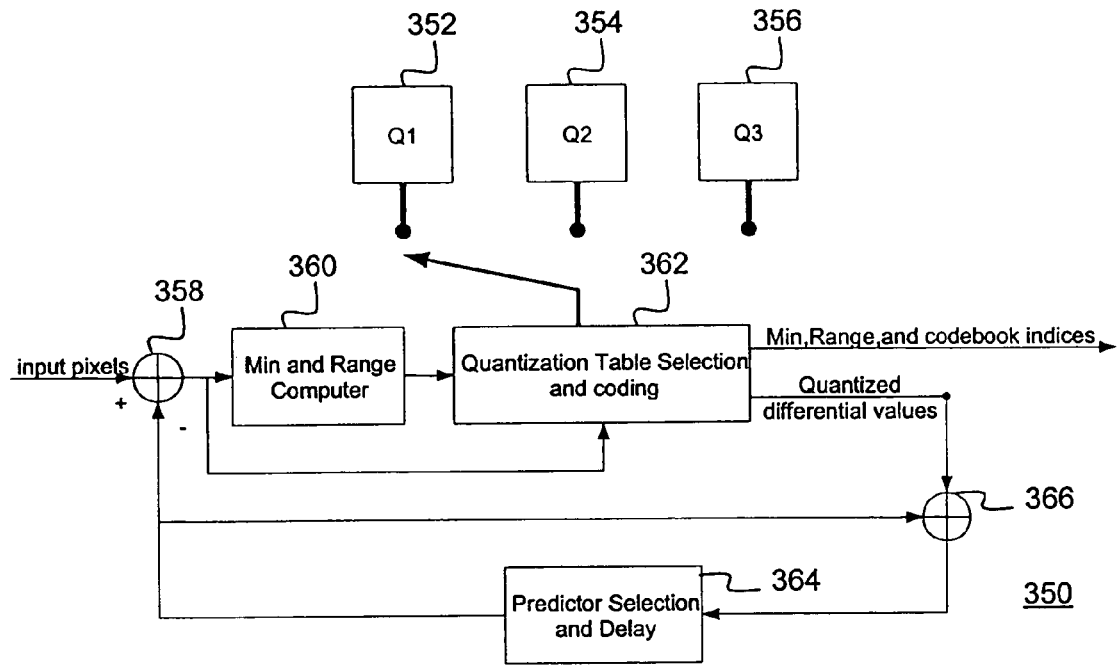
FIG. 7A is a block diagram of an adaptive DPCM encoder, which may be included, for example, in the block-based image compressor of FIG. 6.
Figure 7B:
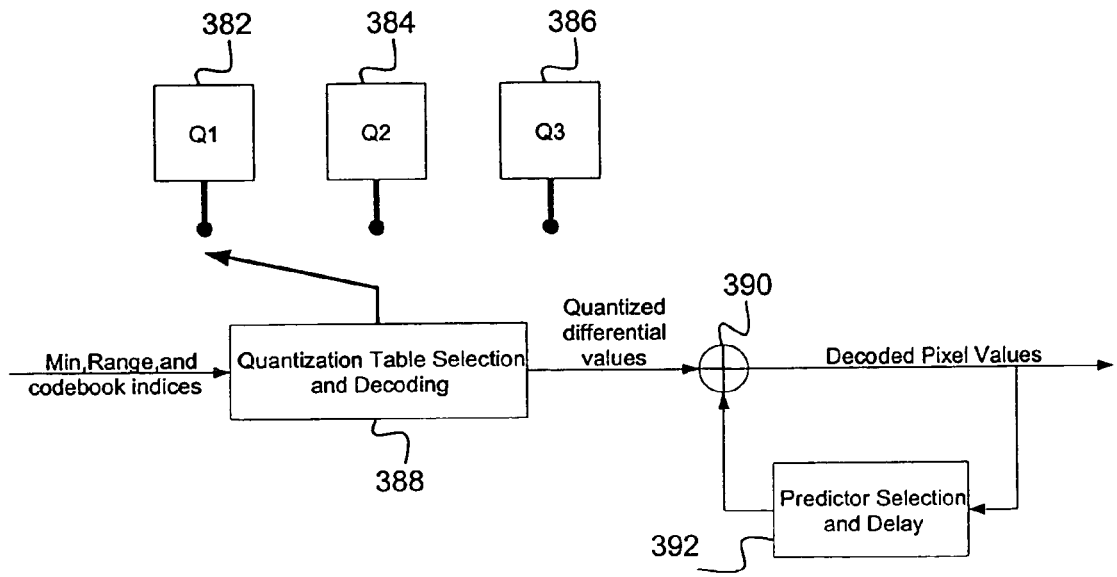
FIG. 7B is a block diagram of an adaptive DPCM decoder, which may be included, for example, in the block-based image decompressor of FIG. 6.

The details of the gain-adaptive DPCM in an embodiment of the present invention are illustrated in FIGS. 7A and 7B. FIG. 7A is a block diagram of an adaptive DPCM encoder, which may be included, for example, in the block-based image compressor 316 of FIG. 6. FIG. 7B is a block diagram of an adaptive DPCM decoder, which may be included, for example, in the block-based image decompressor 312 of FIG. 6. Quantization (coding) efficiency is accomplished by using the dynamic range of the prediction residues for each block to adaptively select a set of quantization tables in the compression and decompression process. The selection of quantization tables is based on the range information.

The adaptive DPCM encoder 350 includes quantization tables Q1 352, Q2 354 and Q3 356. The quantization tables Q1, Q2 and Q3 may be implemented outside of the DPCM encoder 350, and may be shared by the DPCM decoder 380 of FIG. 7B. The adaptive DPCM encoder 350 also includes a subtractor 358, a range computer 360, a quantizer (quantization table selector/coder) 362, a summer 366 and a predictor selector 364.

The subtractor 358 receives input pixels and outputs prediction residues to the range computer 360 and the quantizer 362. The range computer 360 generates quantized range value as well as the quantized minimum and maximum values. Based on the quantized range value, the quantizer 362 adaptively selects the quantization tables Q1 352, Q2 354 and Q3 356. The quantization tables Q1, Q2 and Q3 are provided for illustrative purposes only. In practice, the adaptive DPCM encoder 350 may include or have access to different number of quantization tables.

The quantization tables Q1, Q2 and Q3 are designed on a basis of the statistical model of the predictor by using the Lloyd algorithm. The procedure for generating quantization tables (PCM tables) will be discussed later in reference to FIG. 9. Since the quantized range value is used in the quantization process for each individual block, the quantized range value is used for the dequantization process and it is thus included in the header of each compressed data block along with the quantized minimum value by the data multiplexer. The quantizer 362 provides the minimum value, the range value and the codebook indices to be used for decompression.

The quantizer 362 also provides quantized differential values to the summer 366 to be added to a predictor generated by the predictor selector 364. The predictor provides a prediction value for the current pixel based on the previously quantized left- or up-pixels. The predictor for each pixel is determined by a use of the Graham rule, which is explained in reference to FIG. 8 later. The predictor is also subtracted by the input pixels in the subtractor 358 to generate the prediction residues.

Since the quality of the compressed first pixel is important for the entire block, the first pixel should be compressed with the maximum error of 1. A normalization process, with the minimum value as the mean and the range as the variance, is applied to differential values for the gain-adaptive DPCM. To improve the overall performance further, the negative prediction residues (the differences between the coded pixel and the predictor) are also converted to positive values by the normalization process, for example, by adding a fixed value to all the prediction residues. Therefore, all of the available quantization levels preferably are placed to cover only the positive part of prediction residues.

To provide an easy access to memory for motion-compensation, the compressed data for each image block should have a fixed size. Thus, each compressed block has a clear and distinctive boundary in the memory and can be easily accessed with simple circuitry. For example, the indices are fixed-length coded rather than variable-length coded so that the location of the compressed block in memory can be located by simply using the original address divided by two since the compressed block is half the size of the uncompressed block.

The DPCM decoder 380 of FIG. 7B includes a dequantizer 388, a summer 390 and a predictor selector 392. The DPCM decoder 380 may include quantization tables Q1 382, Q2 384 and Q3 386 as well as other quantization tables. The DPCM decoder 380 may also share the quantization tables with the DPCM encoder 350 of FIG. 7A. The dequantizer 388 receives the minimum value, the range value and the codebook indices from the DPCM encoder 350, and generates quantized differential values by adaptively selecting the quantization tables and decoding the compressed data using the selected quantization tables. In other words, the codebook indices include information about conversion from quantization level to the quantized value.

The quantized differential values are added with the predictor in the summer 390 to be provided as decoded pixel values. The decoded pixel values, in turn, may be provided to the predictor selector 392 to be delayed and provided as a predictor to the summer 390 for generation of other decoded pixel values.

Figure 8:
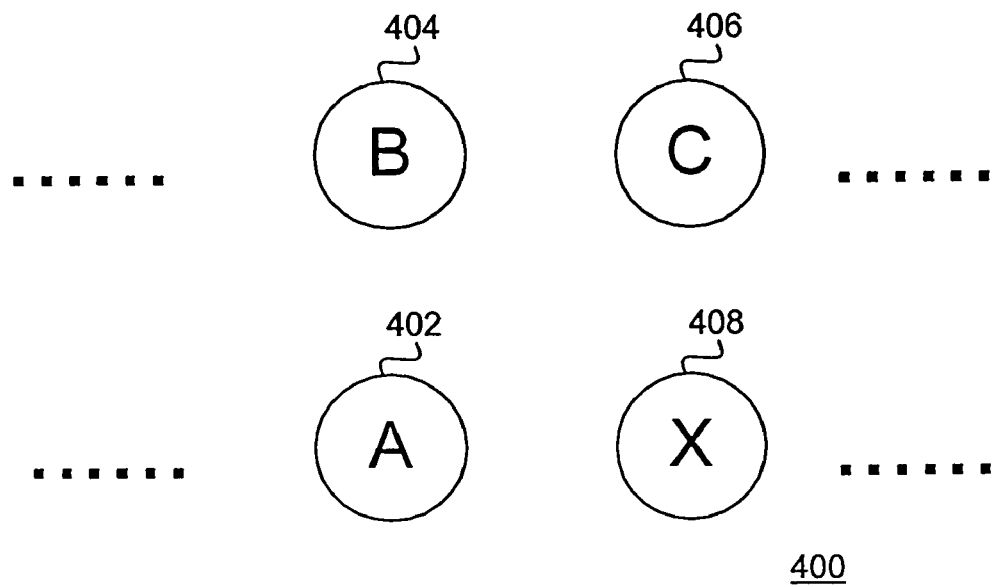
FIG. 8 illustrates previous neighbor pixels used in the DPCM prediction.

FIG. 8 illustrates previous neighbor pixels used in the DPCM prediction (e.g., in the predictor selector 364 of FIG. 7A or the predictor selector 392 of FIG. 7B) where X 408 is the current pixel. The quantized values of the previously decoded pixels, A 402, B 404, C 406 are used to determine the direction of the DPCM as follows.

If (|A−B|<|B−C|)
　　C is selected as the predictor;
Else
　　A is selected as the predictor.

For example, when the X pixel 408 is the current pixel, the X pixel 408 may be predicted from the C pixel 406 (upper pixel) or the A pixel 402 (left pixel), which are two adjacent pixels that are typically coded before the X pixel 408. An absolute value |A-C| of the difference in intensity between the A pixel 402 and the C pixel 406 is taken, and an absolute value |B-C| of the difference in intensity between the B pixel 404 and the C pixel 406 is taken.

If the absolute value of the difference between A 402 and B 404 is less than the absolute value of the difference between B 404 and C 406, C 406 is selected as the predictor; otherwise, A 402 is selected as the predictor. This is because of correlation between adjacent pixels. If there is a bigger difference between two adjacent pixels, there most likely is an edge (or a boundary) between them. For example, if the difference between A 402 and B 404 is bigger, there may be a horizontal edge between A 402 and B 404, and thus between C 406 and X 408 as well. Similarly, if the difference between B 404 and C 406 is bigger, there may be a vertical edge between B 404 and C 406, and thus between A 402 and X 408. In the case where edges exist, this decision rule (Graham rule) takes the up-pixel as the predictor for the vertical edges and the left-pixel as the predictor for the horizontal edges.

B. Generation of the Quantization (PCM) Tables

The PCM Tables may be generated using statistical values for image pixels during fabrication of the MPEG-2 decoder, during set top box manufacturing and/or during operation of the MPEG-2 decoder. Initialization of the PCM table is performed by simply grouping the histogram values. Then, the PCM table is refined by using the Lloyd quantizer design algorithm below.

Figure 9:
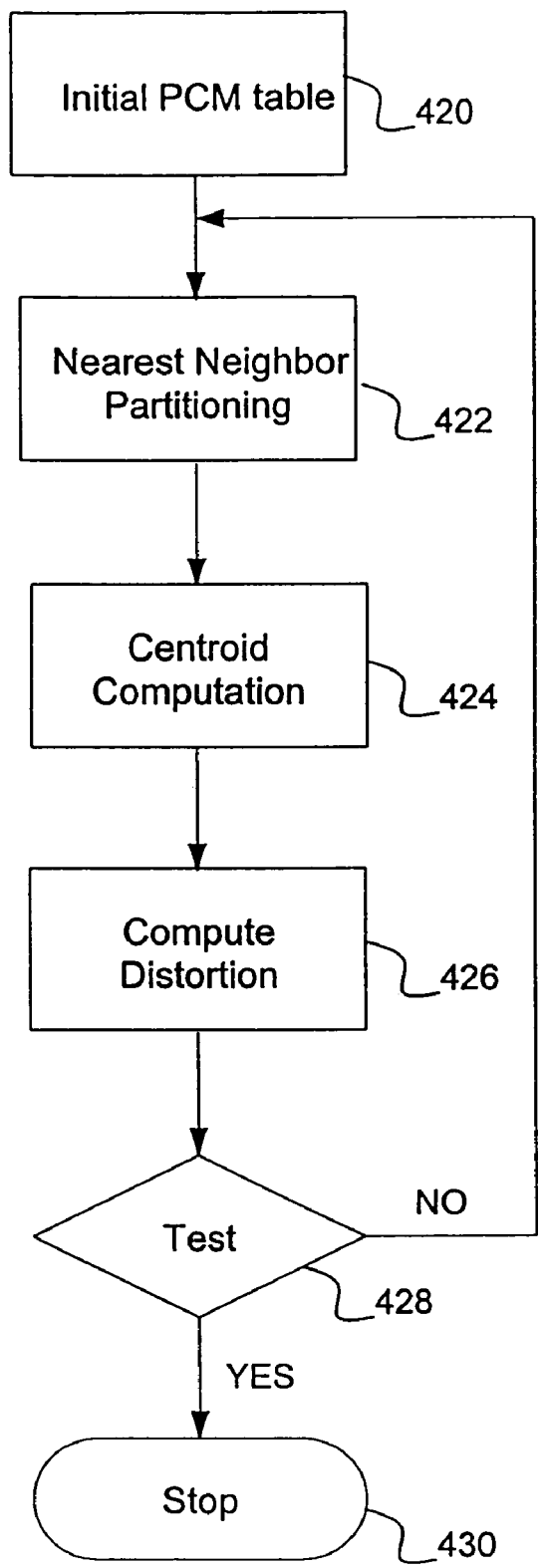
FIG. 9 is a flow diagram of the Lloyd algorithm for quantizer design in an embodiment according to the present invention.

FIG. 9 is a flow diagram of the Lloyd algorithm for quantizer design, such as, for example, the quantizer 362 of FIG. 7A or the quantizer 388 of FIG. 7B. In step 420, PCM table is initialized. For example, an initial PCM table PCMtab(1) with m=1 is set up. Then in steps 422, 424 and 426, given the PCM table, PCMtab(m) (which initially is PCMtab(1) of step 420), a Lloyd Iteration is performed to generate the improved PCM table PCMtab(m+1). In step 422 of the Lloyd iteration, a nearest neighbor partitioning is performed. Further during the Lloyd iteration, a centroid is computed in step 424, and the distortion is computed in step 426. In step 428 of the process, a test is performed to see whether the average distortion for PCMatb(m+1) has changed by a small enough amount since the last iteration, stop. If test passes, the process stops at step 430. If, however, the test does not pass, m=m+1 and the process returns to step 422 for another Lloyd iteration.

Although the compression is not lossless, the picture quality is typically very good without noticeable degradation. The adaptive DPCM technique of this embodiment may be combined with the adaptive-enabling technique (of the RMM mode), also of the present invention, to provide good picture quality for decoding and display of HD sequences in the RMM mode.

Although this invention has been described in certain specific embodiments, many additional modifications and variations would be apparent to those skilled in the art. It is therefore to be understood that this invention may be practiced otherwise than as specifically described. Thus, the present embodiments of the invention should be considered in all respects as illustrative and not restrictive, the scope of the invention to be determined by the appended claims and their equivalents.

We claim:

1. A video decoding system for receiving a digital bitstream and for decoding the digital bitstream, the system comprising:
　　a video decoder for decoding the digital bitstream to generate a plurality of pictures, each picture being associated with a first flag for providing an indication on whether or not the picture is to be implemented with a reduced memory mode and a second flag for providing an indication on whether or not the picture is to be reduced in size to picture data prior to being stored, the indication of the second flag being adaptively determined after a picture type of the associated picture has been first determined by the decoder;
　　means for converting one or more pictures to picture data;

a memory comprising a plurality of buffers, the picture being stored in a buffer as the picture data when the indication of the associated first flag is indicating switched-on and the indication of the associated second flag is indicating armed, and the picture being stored in two or more buffers without size reduction when the indication of the associated first flag is indicating switched-off or the indication of the associated second flag is indicating unarmed; and recovery means for recovering the pictures from the picture data and for providing the pictures to the video decoder for use during decoding of the digital bitstream.

2. The video decoding system according to claim 1, further comprising:

a counter for counting a particular picture type of a plurality of pictures, wherein the indication of the associated second flag is adaptively determined by the counter and after the picture type of the associated picture has been first determined by the decoder.

3. The video decoding system according to claim 2, wherein both the indication of the associated second flag is indicating armed and the counter is initialized when both the picture is an independent decodable picture type and the indication of the associated first flag is indicating switched-on.

4. The video decoding system according to claim 2, wherein both the indication of the associated second flag is indicating unarmed and the counter is initialized when both the picture is a discardable picture type and the indication of the associated first flag is indicating switched-on.

5. The video decoding system according to claim 2, wherein the indication of the associated second flag is indicating armed at times and unarmed at other times when the picture is a non-discardable picture type and when the indication of the associated first flag is indicating switched-on.

6. The video decoding system according to claim 5, wherein the pictures comprise frames, the indication of the second flag associated with every first non-discardable frame following an independent decodable frame is indicating armed, and the respective indications of the second flags associated with other non-discardable frames are indicating unarmed.

7. The video decoding system according to claim 5, wherein the pictures comprise fields, and the respective indications of the second flags associated with up to four non-discardable fields following an independent decodable field or a discardable field are indicating armed when the first one of the non-discardable fields is a top field.

8. The video decoding system according to claim 5, wherein the pictures comprise fields, the respective indications of the second flags associated with up to three non-discardable fields following an independent decodable field are indicating armed when the first one of the non-discardable field is a bottom field.

9. The video decoding system according to claim 1, wherein the indication of the associated second flag is indicating armed when both the picture is an independent decodable picture type and the indication of the associated first flag is indicating switched-on.

10. The video decoding system according to claim 1, wherein the indication of the associated second flag is indicating unarmed when both the picture is a discardable picture type and the indication of the associated first flag is indicating switched-on.

11. The video decoding system according to claim 1, wherein the indication of the associated second flag is indicating armed at times and unarmed at other times when the picture is a non-discardable picture type and when the indication of the associated first flag is indicating switched-on.

12. The video decoding system according to claim 11, wherein the pictures comprise frames, the indication of the second flag associated with every first non-discardable frame following an independent decodable frame is indicating armed, and the respective indications of the second flags associated with other non-discardable frames are indicating unarmed.

13. The video decoding system according to claim 11, wherein the pictures comprise fields, and the respective indications of the second flags associated with up to four non-discardable fields following an independent decodable field or a discardable field are indicating armed when the first one of the non-discardable fields is a top field.

14. The video decoding system according to claim 11, wherein the pictures comprise fields, the respective indications of the second flags associated with up to three non-discardable fields following an independent decodable field are indicating armed when the first one of the non-discardable field is a bottom field.

15. The video decoding system according to claim 1, wherein the video decoding system is used as part of a picture-in-picture decoder circuit for providing picture-in-picture capability without providing multiple full-resolution video decoders.

16. The video decoding system according to claim 1, wherein the associated first flag is switched-on to provide picture-in-picture capability without providing multiple full-resolution video decoders.

17. The video decoding system according to claim 1, wherein the indication of the associated first flag is indicating switched-on when the digital bit stream of the associated picture is a picture-in-picture stream.

18. The method of decoding a digital bitstream, the method comprising the steps of:

decoding the digital bitstream to generate a plurality of pictures, each picture being associated with a first flag for indicating whether or not the picture is to be implemented with a reduced memory mode and a second flag for indicating whether or not the picture is to be reduced in size to picture data prior to being stored in a memory, the memory comprising a plurality of buffers;

determining a picture type of the picture;

converting one or more pictures to picture data;

storing the picture in a buffer as the picture data when the associated second flag is armed adaptively and when the first flag is switched-on;

storing the picture in two or more buffers without size reduction when the associated second flag is unarmed or when the associated first flag is switched-off; and recovering the pictures from the picture data to be used during decoding of the digital bitstream.

19. The method of decoding a digital bitstream according to claim 18, wherein the method is used in a picture-in-picture decoder circuit for providing picture-in-picture capability without providing multiple full-resolution video decoders.

20. A method of generating a display video stream using a digital bitstream, the method comprising:

a) decoding the digital bitstream to generate 1-HDTV pictures, the HDTV pictures including one or more anchor pictures;

b) compressing the anchor pictures in spatial domain using a gain adaptive quantization differential compression algorithm to generate compressed bits, the compressed bits being both differenced and quantized;

c) storing the compressed bits in memory;

d) decompressing the compressed bits using a gain adaptive quantization differential decompression algorithm to generate the anchor pictures; and e) repeating a)-d) using the decompressed anchor pictures during the decoding of the digital bitstream, wherein a)-e) is used in a picture-in-picture decoder circuit for providing picture-in-picture capability without providing multiple full-resolution video decoders.

21. The method of generating a display video stream according to claim 20, wherein a)-e) are only performed for those anchor pictures associated with a flag indicating a reduced memory mode.

* * * * *